US008351785B2

(12) United States Patent
Luo et al.

(10) Patent No.: US 8,351,785 B2
(45) Date of Patent: Jan. 8, 2013

(54) GIGABIT PASSIVE OPTICAL NETWORK TRANSMISSION CONVERGENCE EXTENSION FOR NEXT GENERATION ACCESS

(75) Inventors: Yuanqiu Luo, Cranbury, NJ (US); Frank J. Effenberger, Freehold, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 710 days.

(21) Appl. No.: 12/355,837

(22) Filed: Jan. 19, 2009

(65) Prior Publication Data
US 2009/0263130 A1   Oct. 22, 2009

Related U.S. Application Data

(60) Provisional application No. 61/046,474, filed on Apr. 21, 2008.

(51) Int. Cl.
*H04B 10/20* (2006.01)
*G06F 15/16* (2006.01)
*G06F 15/167* (2006.01)
*G06F 9/26* (2006.01)

(52) U.S. Cl. .......... 398/58; 398/154; 709/212; 709/236; 711/201

(58) Field of Classification Search .................. 398/43, 398/58, 66–68, 70–72, 154; 370/235, 242, 370/389, 390, 412, 465, 469, 503; 709/212–214, 709/232, 236; 713/151, 153, 160; 725/50
See application file for complete search history.

(56) References Cited

U.S. PATENT DOCUMENTS

| 5,559,963 | A | * | 9/1996 | Gregg et al. | 709/234 |
| 5,610,945 | A | * | 3/1997 | Gregg et al. | 375/260 |
| 6,065,070 | A | * | 5/2000 | Johnson | 710/22 |
| 6,092,116 | A | * | 7/2000 | Earnest et al. | 709/236 |
| 6,690,676 | B1 | * | 2/2004 | Gulick | 370/458 |
| 6,714,553 | B1 | * | 3/2004 | Poole et al. | 370/412 |
| 7,231,505 | B1 | * | 6/2007 | Bishara | 711/201 |
| 7,356,047 | B1 | * | 4/2008 | Mahalawat et al. | 370/469 |
| 7,376,136 | B2 | * | 5/2008 | Song et al. | 370/392 |

(Continued)

FOREIGN PATENT DOCUMENTS
CN    101043294 A    9/2007
(Continued)

OTHER PUBLICATIONS

Foreign Communication From a Related Counterpart Application, Korean Application 10-2010-7022537, Korean Office Action dated Nov. 30, 2011, 3 pages.

(Continued)

*Primary Examiner* — Loha Ben
(74) *Attorney, Agent, or Firm* — Conley Rose, P.C.; Grant Rodolph; Stephen R. Loe

(57) ABSTRACT

An apparatus comprising a data framer configured to frame a data stream into a plurality of frames each comprising a plurality of fields sized to align the frames with a word boundary greater than or equal to about four bytes long, and an optical transmitter coupled to the data framer and configured to transmit the frames. Included is an apparatus comprising at least one component configured to implement a method comprising encapsulating a data stream with at least one Gigabit Passive Optical Network (GPON) Encapsulation Method (GEM) payload aligned with a word boundary at least about four bytes long, encapsulating the GEM payload with a GPON Transmission Convergence (GTC) frame aligned with the word boundary, and transmitting the GTC frame.

16 Claims, 4 Drawing Sheets

U.S. PATENT DOCUMENTS

| | | | |
|---|---|---|---|
| 7,386,699 B1 * | 6/2008 | Bishara | 711/201 |
| 7,450,515 B2 * | 11/2008 | Song et al. | 370/236.2 |
| 7,535,913 B2 * | 5/2009 | Minami et al. | 370/401 |
| 7,535,930 B2 | 5/2009 | Lim et al. | |
| 7,818,389 B1 | 10/2010 | Chiang et al. | |
| 7,853,801 B2 | 12/2010 | Kim et al. | |
| 7,870,361 B1 * | 1/2011 | Bishara | 711/201 |
| 7,983,308 B1 | 7/2011 | Johnston et al. | |
| 7,991,296 B1 * | 8/2011 | Johnston et al. | 398/154 |
| 8,019,825 B1 | 9/2011 | Johnston et al. | |
| 8,190,026 B2 * | 5/2012 | Luo et al. | 398/58 |
| 2004/0208631 A1 | 10/2004 | Song et al. | |
| 2004/0218534 A1 | 11/2004 | Song et al. | |
| 2006/0136614 A1 | 6/2006 | Kakani et al. | |
| 2008/0040604 A1 | 2/2008 | Kim et al. | |
| 2008/0287069 A1 | 11/2008 | Yoshimura | |

FOREIGN PATENT DOCUMENTS

| | | |
|---|---|---|
| JP | 10308944 A | 11/1988 |
| JP | 06252955 A | 9/1994 |
| JP | 2004320745 A | 11/2004 |
| JP | 2008508818 A | 3/2008 |
| JP | 2008288719 A | 11/2008 |

OTHER PUBLICATIONS

Foreign Communication From a Related Counterpart Application, Russian Application 2010147630(068787), Russian Office Action dated Apr. 14, 2009, 6 pages.

Series G: Transmission Systems and Media, Digital Systems and Networks—Digital Sections and Digital Line System—Optical Line Systems for Local and Access Networks—Gigabit-Capable Passive Optical Networks (G-PON): Transmission Convergence Layer Specification; ITU-T G.984.3 (Mar. 2008).

Foreign communication from a counterpart application, European application 09733782.8, Extended European Search Report dated Jan. 26, 2011, 5 pages.

Foreign communication from a counterpart application, PCT application PCT/CN2009/071264, International Search Report dated Jul. 23, 2009, 4 pages.

Foreign communication from a counterpart application, PCT application PCT/CN2009/071264, Written Opinion dated Jul. 23, 2009, 6 pages.

Foreign Communication From a Related Counterpart Application, Japanese Application No. 2011-504301, Japanese Office Action dated Feb. 7, 2012, 4 pages.

Yoshihara, S., et al., "Proposal of Dynamic Bandwidth Assignment Algorithm for G-PON," Institute of Electronics, Information, and Communication Engineers Technical Report, vol. 103 No. 415, Nov. 14, 2003, 6 pages.

IEEE Draft, P802.3av™ D2.2, "Part 3: Carrier Sense Multiple Access with Collision Detection (CSMA/CD) Access Method and Physical Layer Specifications, Amendment: Physical Layer Specifications and Management Parameters for 10 Gb/s Passive Optical Networks," IEEE Computer Society, Dec. 3, 2008, 267 pages.

International Telecommunication Union, ITU-T, G.984.3, Telecommunication Standardization Sector of ITU, "Series G: Transmission Systems and Media, Digital Systems and Networks, Digital Sections and Digital Line System—Optical Line Systems for Local and Access Networks, Gigabit Passive Optical Networks (G-PON): Transmission Convergence Layer Specification," Feb. 2004, 116 pages.

Office Action dated Dec. 27, 2011, U.S. Appl. No. 13/287,677 filed Nov. 2, 2011, 6 pages.

Notice of Allowance dated Jan. 27, 2012, U.S. Appl. No. 13/287,677, filed Nov. 2, 2011, 9 pages.

Foreign Communication From a Counterpart Application; Australian Patent Application No. 2009240705; Patent Examination Report No. 1 dated Sep. 4, 2012, 4 pages.

* cited by examiner

GIGABIT PASSIVE OPTICAL NETWORK TRANSMISSION CONVERGENCE EXTENSION FOR NEXT GENERATION ACCESS

CROSS-REFERENCE TO RELATED APPLICATIONS

The present application claims priority to U.S. Provisional Patent Application 61/046,474, filed Apr. 21, 2008 by Yuanqiu Luo et al., and entitled "Gigabit Passive Optical Network Transmission Convergence Extension for Next Generation Access," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) is one system for providing network access over "the last mile." The PON is a point to multi-point network comprised of an optical line terminal (OLT) at the central office, an optical distribution network (ODN), and a plurality of optical network units (ONUs) at the customer premises. In some PON systems, such as Gigabit PON (GPON) systems, downstream data is broadcasted at about 2.5 Gigabits per second (Gbps) while upstream data is transmitted at about 1.25 Gbps. However, the bandwidth capability of the PON systems is expected to increase as the demands for services increase. To meet the increased demand in services, the logic devices in emerging PON systems, such as Next Generation Access (NGA), are being reconfigured to transport the data frames at higher bandwidths, for example at about ten Gbps, and to support a larger number of ONUs.

SUMMARY

In one embodiment, the disclosure includes an apparatus comprising a data framer configured to frame a data stream into a plurality of frames each comprising a plurality of fields sized to align the frames with a word boundary greater than or equal to about four bytes long, and an optical transmitter coupled to the data framer and configured to transmit the frames.

In another embodiment, the disclosure includes an apparatus comprising at least one component configured to implement a method comprising encapsulating a data stream with at least one GPON Encapsulation Method (GEM) payload aligned with a word boundary at least about four bytes long, encapsulating the GEM payload with a GPON Transmission Convergence (GTC) frame aligned with the word boundary, and transmitting the GTC frame.

In yet another embodiment, the disclosure includes a method comprising encapsulating a data stream into a plurality of fields, aligning the lengths of the fields individually or combined to a word boundary equal to at least about four bytes, packaging the fields into a frame, and transmitting the frame.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Reconfiguring the PON system's logic to support higher transmission rates or more ONUs may include modifying existing protocols, such as a GPON protocol as defined by the ITU-T G.984.3 standard, which is incorporated herein by reference. The GPON protocol comprises a GTC layer that defines the frames for encapsulating the data, such as Ethernet frames or other packets. Disclosed herein is a system and method for extending the GTC layer of the GPON protocol for NGA. The extended GTC layer may define a plurality of frames similar to the GTC layer of the GPON protocol, where at least some of the frames may be modified to support higher bandwidth for NGA. Additionally, the modified frames may be used for transporting a larger number of data flows for a larger quantity of ONUs. The modified frames may comprise downstream GTC frames and upstream GTC frames, which may comprise network control and management information and GEM payloads.

To support the increase in transmission rates, the length of the fields of the modified frames may be aligned with a similarly scaled word boundary. For instance, if the transmission rates are increased about four times, e.g., to about ten Gbps, the length of the fields of the modified frames may be aligned with about four times the word boundary, e.g., to about four bytes. Alternatively, the word boundary may be any integer multiple of about four bytes long. Accordingly, the GEM payloads and other network control and management information may be encapsulated into frames comprising field lengths equal to integer multiples of about four bytes. As such, the data may be encapsulated and de-capsulated using available electronic circuits with about the same performance or processing speed and without substantial upgrades or increase in complexity. The increase in the length of the fields may also provide more addresses or identifiers to support more ONUs and more data flows. Additionally, at least some of the fields may be updated to deprecate or disable Asynchronous Transfer Mode (ATM) functionality, which may not be used for NGA.

Figure 1:
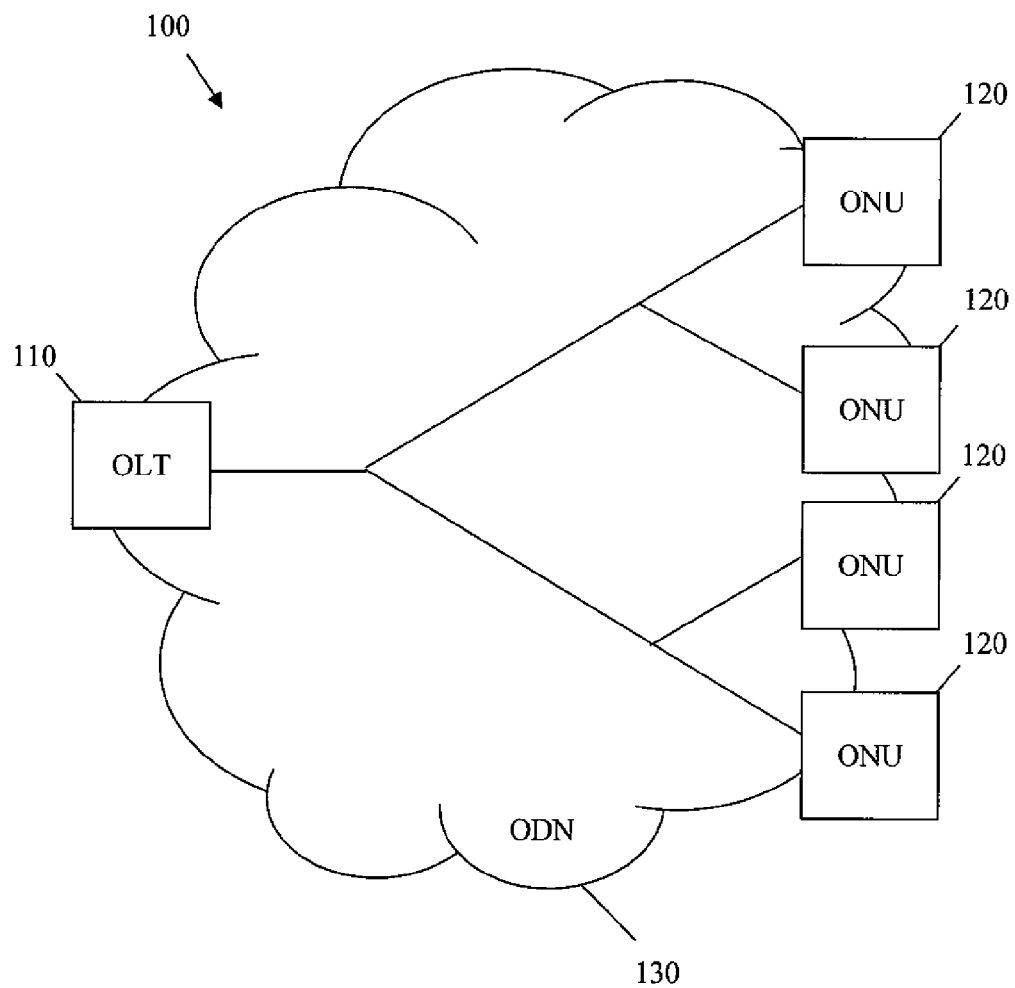
FIG. 1 is a schematic diagram of an embodiment of a PON.

FIG. 1 illustrates one embodiment of a PON 100. The PON 100 comprises an OLT 110, a plurality of ONUs 120, and an ODN 130, which may be coupled to the OLT 110 and the ONUs 120. The PON 100 may be a communications network that does not require any active components to distribute data between the OLT 110 and the ONUs 120. Instead, the PON 100 may use the passive optical components in the ODN 130 to distribute data between the OLT 110 and the ONUs 120. The PON 100 may be NGA systems, such as ten Gbps GPONs (or XGPONs), which may have a downstream bandwidth of about ten Gbps and an upstream bandwidth of at least about 2.5 Gbps. Other examples of suitable PONs 100 include the asynchronous transfer mode PON (APON) and the broadband PON (BPON) defined by the ITU-T G.983 standard, the GPON defined by the ITU-T G.984 standard, the Ethernet PON (EPON) defined by the IEEE 802.3ah standard, and the wavelength division multiplexed (WDM) PON (WPON), all of which are incorporated herein by reference as if reproduced in their entirety.

In an embodiment, the OLT 110 may be any device that is configured to communicate with the ONUs 120 and another network (not shown). Specifically, the OLT 110 may act as an intermediary between the other network and the ONUs 120. For instance, the OLT 110 may forward data received from the network to the ONUs 120, and forward data received from the ONUs 120 onto the other network. Although the specific configuration of the OLT 110 may vary depending on the type of PON 100, in an embodiment, the OLT 110 may comprise a transmitter and a receiver. When the other network is using a network protocol, such as Ethernet or Synchronous Optical Networking/Synchronous Digital Hierarchy (SONET/SDH), that is different from the PON protocol used in the PON 100, the OLT 110 may comprise a converter that converts the network protocol into the PON protocol. The OLT 110 converter may also convert the PON protocol into the network protocol. The OLT 110 may be typically located at a central location, such as a central office, but may be located at other locations as well.

In an embodiment, the ONUs 120 may be any devices that are configured to communicate with the OLT 110 and a customer or user (not shown). Specifically, the ONUs 120 may act as an intermediary between the OLT 110 and the customer. For instance, the ONUs 120 may forward data received from the OLT 110 to the customer, and forward data received from the customer onto the OLT 110. Although the specific configuration of the ONUs 120 may vary depending on the type of PON 100, in an embodiment, the ONUs 120 may comprise an optical transmitter configured to send optical signals to the OLT 110 and an optical receiver configured to receive optical signals from the OLT 110. Additionally, the ONUs 120 may comprise a converter that converts the optical signal into electrical signals for the customer, such as signals in the Ethernet or ATM protocol, and a second transmitter and/or receiver that may send and/or receive the electrical signals to a customer device. In some embodiments, ONUs 120 and optical network terminals (ONTs) are similar, and thus the terms are used interchangeably herein. The ONUs may be typically located at distributed locations, such as the customer premises, but may be located at other locations as well.

In an embodiment, the ODN 130 may be a data distribution system, which may comprise optical fiber cables, couplers, splitters, distributors, and/or other equipment. In an embodiment, the optical fiber cables, couplers, splitters, distributors, and/or other equipment may be passive optical components. Specifically, the optical fiber cables, couplers, splitters, distributors, and/or other equipment may be components that do not require any power to distribute data signals between the OLT 110 and the ONUs 120. Alternatively, the ODN 130 may comprise one or a plurality of processing equipment, such as optical amplifiers. The ODN 130 may typically extend from the OLT 110 to the ONUs 120 in a branching configuration as shown in FIG. 1, but may be alternatively configured in any other point-to-multi-point configuration.

In an embodiment, the OLT 110 and the ONUs 120 may comprise a data framer, which may be coupled to the transmitter and/or the receiver. Specifically, the data framer may be any device configured to process the data between the OLT 110 and the ONUs 120 by encapsulating the data, such as Ethernet data, into frames or decapsulating the data from the frames according to a PON protocol. For instance, the data framer may be hardware, such as a processor, comprising electronic or logic circuitry, which may be designed for such purpose. Alternatively, the data framer may be software or a firmware, which may be programmed for such purpose. The PON protocol may be used by the OLT 110 and the ONUs 120 to exchange the data, such as a GPON protocol defined by the ITU-T G.984.3 standard. The GPON protocol may comprise a GTC layer that provides a plurality of functionalities, including media access control (MAC) functionalities for data framing over upstream and downstream channels, a GEM for framing the data, and status reporting signaling using dynamic bandwidth allocation for upstream data.

In an embodiment, the GTC layer may define a word boundary, which may represent a fixed logic block that aligns the data in the frames. The data framer may align the length of the data fields of the frames to the word boundary to avoid variable or odd length fields in the frames and hence variable or odd length logic blocks. Variable or odd length logic blocks may be undesirable because they may be more difficult to process using the data framer at the OLT 110 or the ONUs 120. The word boundary may be chosen based on the transmission rates of the system, such that the aligned data can be processed using available electronic circuits with tolerable processing speeds or clock speeds. For example, in GPON systems, the word boundary may be set to about one byte (about eight bits), and hence the length of the fields may be equal to integer multiples of about one byte.

To accommodate the higher data rates for NGA, the GTC layer of the GPON protocol may be extended by increasing the word boundary based on the increased bandwidth. Specifically, as the data rates increase, the available electronic circuits or logic circuitry may require higher clock speeds for processing and framing the data, which may not be practical. However, when the word boundary is increased, more data per logic block may be handled by such circuits, which may reduce the clock speed requirement. Accordingly, the word boundary may be scaled proportionally to the increase in bandwidth to maintain about the same processing speed requirement, which may be achieved by the available electronic circuits. For instance, to accommodate the higher data rates for NGA at about ten Gbps, which may be equal to about four times the 2.5 Gbps rate, the word boundary of about one byte may be scaled proportionally by about four times. As such, the increased word boundary in the extended GTC layer may be equal to about four bytes or about 32 bits. In other embodiments, the increased word boundary may be greater than about four bytes, for example about eight bytes. Further, the frame may be aligned with the increased word boundary by increasing the length of the fields in the frames. The increased field lengths may also be used to accommodate more values, addresses, or identifiers to support more ONUs 120, more data flows, or both.

Figure 2:
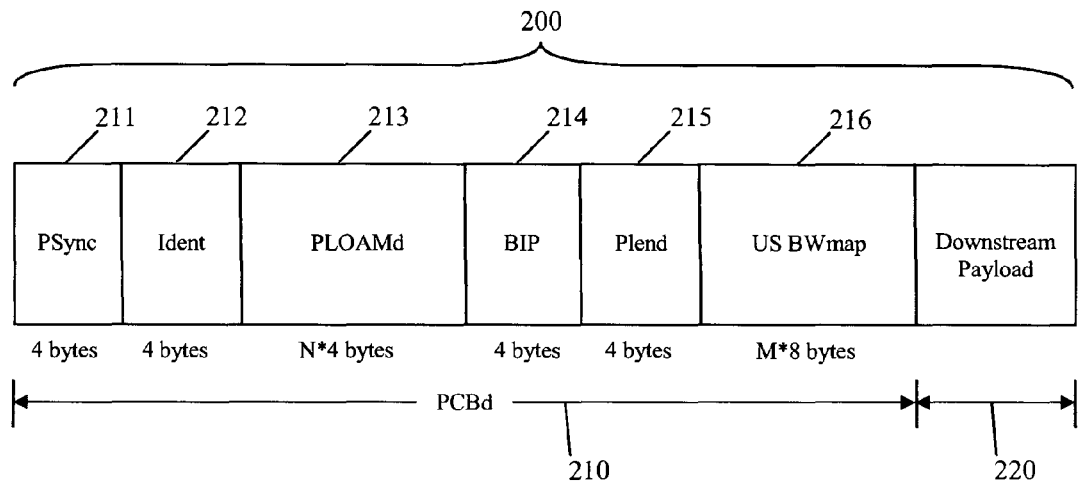
FIG. 2 is an illustration of an embodiment of a downstream GPON Transmission Convergence frame.

FIG. 2 illustrates an embodiment of a downstream GTC frame 200. The downstream GTC frame 200 may comprise downstream data transmitted from the OLT 110 to any of the ONUs 120, for instance over a downstream channel. For instance, the downstream GTC frame 200 may broadcasted by the OLT 110 and comprise payload data as well as network control and management information. Each ONU 120 may receive the downstream GTC frame 200 and identify the corresponding data assigned to the ONU 120 using some addressing information, such as an ONU identifier (ONU-ID). The downstream GTC frame 200 may comprise a Physical Control Block downstream (PCBd) 210 and a Downstream Payload 220, which may be a GEM payload as described below. The PCBd 210 may comprise a plurality of fields, such as a Physical Synchronization (PSync) 211, an Identification (Ident) 212, a Physical Layer Operations, Administration and Maintenance (PLOAM) downstream or PLOAMd 213, a Bit Interleaved Parity (BIP) 214, a Payload Length downstream (Plend) 215, and an Upstream Bandwidth map (US BWmap) 216.

The PSync 211 may comprise a fixed pattern that precedes the remaining fields in the PCBd 210. This pattern may be used at the ONUs 120, for instance at the data framer coupled to the receiver, to detect the beginning of the downstream GTC frame 200 and establish synchronization. For example, the PSync 211 may comprise the fixed pattern 0xB6AB31E0, which may not be scrambled. In the GTC layer of the GPON protocol, the length of the PSync 211 may be equal to about four bytes, which may already be aligned and equal to about the increased word boundary to support a higher bandwidth in the GPON or NGA, e.g., about ten Gbps transmission rates. Hence, no changes may be required for the PSync 211 in the extended GTC layer.

The Ident 212 may comprise a counter to provide lower rate synchronous reference signals, which may be used by the ONU 120 with the PSync 211 for synchronization purposes. For instance, similar to the PSync 211, the length of the Ident 212 in the GPON protocol may be equal to about 32 bits, of which the first bit may be a forward error correction (FEC) bit, the second bit may be reserved, and the remaining and less significant about 30 bits may comprise a counter that may be incremented for each next transmitted Ident 212. When the counter reaches a predetermined maximum value, the Ident 212 may be reset to zero on the next downstream GTC frame 200. Similar to the PSync 211, since the length of the Ident 212 may be aligned and equal to about the increased word boundary, the Ident 212 may not be changed in the extended GTC layer.

The PLOAMd 213 may comprise a PLOAM message, which may be sent from the OLT 110 to the ONUs 120 and include Operations, Administration and Maintenance (OAM) related alarms or threshold-crossing alerts triggered by system events. The PLOAMd 213 may comprise a plurality of sub-fields, such as an ONU-ID, a message identifier (Message-ID), a message data, and a Cyclic Redundancy Check (CRC). The ONU-ID may comprise an address, which may be assigned to one of the ONUs 120 and may be used by that ONU 120 to detect its intended message. The Message-ID may indicate the type of the PLOAM message and the message data may comprise the payload of the PLOAM message. The CRC may be used to verify the presence of errors in the received PLOAM message. For instance, the PLOAM message may be discarded when the CRC fails. To support the higher bandwidth in the GPON or NGA, the length of the PLOAMd 213 may be changed to an integer multiple of about four bytes long, for example about 16 bytes long, thereby aligning the data at about four bytes. Further, the length of the ONU-ID may be equal to about one byte, and hence may be used to indentify up to about 256 individual ONUs 120. In the extended GTC layer, the length of the ONU-ID may be increased to about four bytes to align the data to the increased word boundary. Accordingly, the extended ONU-ID may be used to identify substantially more than 256 ONUs 120. Further, the format of the CRC, such as a CRC-8 format with generator polynomial $(x^8+x^2+x+1)$, may be changed to account for at least some of the additional bits of the extended PLOAM message. Alternatively, the same CRC format may be used, and hence the first bit in the PLOAMd 213, which may not be covered by the CRC format, may not be protected or considered for error detection.

The BIP 214 may comprise a bit interleaved parity of all the bytes transmitted since the last receive BIP 214. The bit interleaved parity may also be calculated at the ONUs 120 and then compared to the bit interleaved parity of the BIP 214 to measure the number of errors on the link. The BIP 214 may be equal to about four bytes, which aligns it with the increased word boundary in the extended GTC layer.

The Plend 215 may comprise a plurality of subfields, including a B length (Blen) and a CRC. The Blen may indicate the length of the US BWmap 216, where the actual length of the US BWmap 216 in bytes may be equal to about eight times the value of Blen. The CRC may be configured substantially similar to the CRC of the PLOAMd 213. In some systems that support ATM communications, the subfields may also include an A length (Alen) subfield that indicates the length of an ATM payload, which may comprise a portion of the downstream GTC frame 200. To disable or deprecate ATM communications or functionality in the GPON or NGA, the Alen may be removed or discarded in the extended GTC layer. To compensate for the missing bits of the Alen and align the length of the Plend 215 to the increased word boundary, the length of the Blen, the CRC, or both may be adjusted to obtain a total length of about four bytes for the Plend 215. For instance, the length of the CRC may be increased, which also improves error detection.

The US BWmap 216 may comprise an array of blocks or subfields, each of which may have a length of about eight bytes. Each block may comprise a single bandwidth allocation to an individual Transmission Container (T-CONT), which may be used for managing upstream bandwidth allocation in the GTC layer. Specifically, the T-CONT may be a transport entity in the GTC layer that may be configured to transfer higher-layer information from an input to an output, e.g., from the OLT 110 to any of the ONUs 120. Each block may comprise a plurality of subfields, such as an Allocation identifier (Alloc-ID), a Flags, a Start Time (SStart), a Stop Time (SStop), and a CRC. Since the length of the US BWmap 216 may be equal to an integer multiple of about eight bytes, the total length of the US BWmap 216 may already be aligned with the increased word boundary, and hence may not be changed. However, the granularity of the US BWmap 216 may be changed, for instance to about four bytes in each block.

Figure 3:
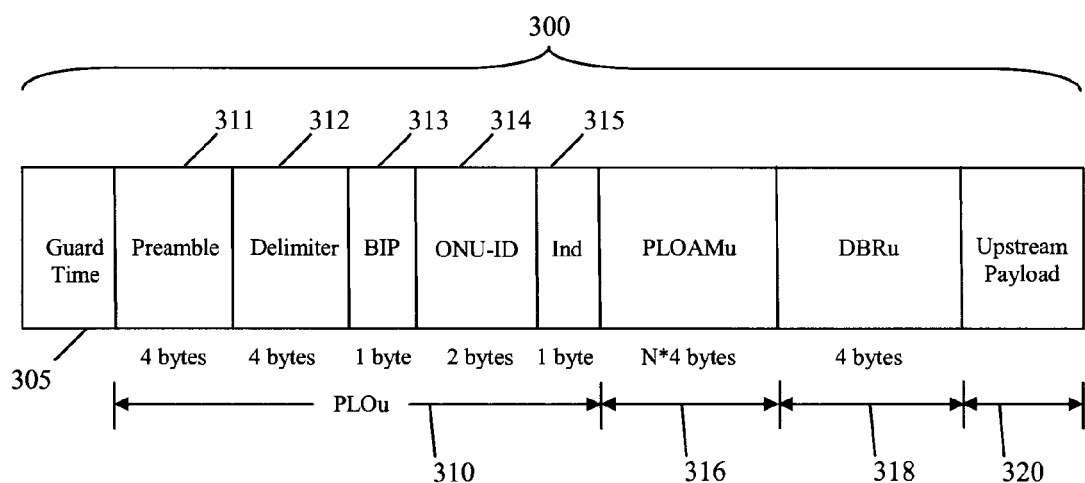
FIG. 3 is an illustration of an embodiment of an upstream GPON Transmission Convergence frame.

FIG. 3 illustrates an embodiment of an upstream GTC frame 300. The upstream GTC frame 300 may comprise upstream data transmitted from one of the ONUs 120 to the OLT 110, including payload data and network control and management information, for instance over an upstream channel. The upstream GTC frame 300 may comprise a Physical Layer Overhead upstream (PLOu) 310, a PLOAM upstream (PLOAMu) 316, a Dynamic Bandwidth Report upstream (DBRu) 318, and an Upstream Payload 320, which may be a GEM payload as described below. The PLOu 310 may comprise a plurality of fields, such as a Preamble 311, a Delimiter 312, a BIP 313, an ONU-ID 314, and an Indication (Ind) 315. The upstream GTC frame 300 may also comprise a Guard Time 305, which may precede the remaining fields and delineate the upstream GTC frame 300.

The combined fields of the PLOu 310 may indicate which ONU 120 may have sent the upstream GTC frame 300 to the OLT 110. For instance, the Preamble 311 and Delimiter 312 may correspond to that ONU 120 and may be formed as indicated by the OLT 110. The BIP 313 may comprise the bit interleaved parity, as described above, and the ONU-ID 314 may comprise the assigned address corresponding to the ONU 120. The Ind 315 may indicate the status of the ONU 120 to the OLT 110, where the upstream GTC frame 300 may be transmitted in substantially real time. In some instances, the BIP 313, the ONU-ID 314, and the Ind 315 may not be aligned with the increased word boundary in the extended GTC layer. Hence, the length of the ONU-ID 314 may be about two bytes, and the BIP 313 and the Ind 315 may be about one byte, thereby obtaining a total length of about four bytes for the three fields, which may be suitable, for instance, for about ten Gbps transmission rates. Increasing the length of the ONU-ID 314 may also provide more addresses that may be assigned to more ONUs 120, e.g., up to about 65,536 ONUs. In some embodiments, the lengths of the Preamble 311 and the Delimiter 312 may also be aligned individually or with the three remaining fields of the PLOu 310 to the increased word boundary.

Similar to the PLOAMd 213 of the downstream GTC frame 200, the PLOAMu 316 may comprise a PLOAM message, which may be sent from the ONU 120 to the OLT 110. The length of the PLOAMu 316 may be an integer multiple of about four bytes long, for example about 16 bytes long, in the extended GTC layer. For instance, the length of the ONU-ID subfield of the PLOAMu 316 may be increased to about two bytes. Further, the format of the CRC subfield, e.g., CRC-8 format with generator polynomial $(x^8+x^2+x+1)$, may not be changed where the first bit in the PLOAMu 316 is not covered.

The DBRu 318 may comprise information that is related to the T-CONT. The DBRu 318 may comprise two subfields, which may be a Dynamic Bandwidth Assignment (DBA) and a CRC. The DBA may indicate a buffer occupancy report, e.g., may comprise the traffic status of the T-CONT. In the extended GTC layer, the length of the DBRu may be matched to the granularity of the US BWmap 216 of the downstream GTC frame 200, e.g., at about four bytes. As such, the code points of Table 8-1 in ITU-T G.984.3 may be deprecated, replaced, or modified.

Figure 4:
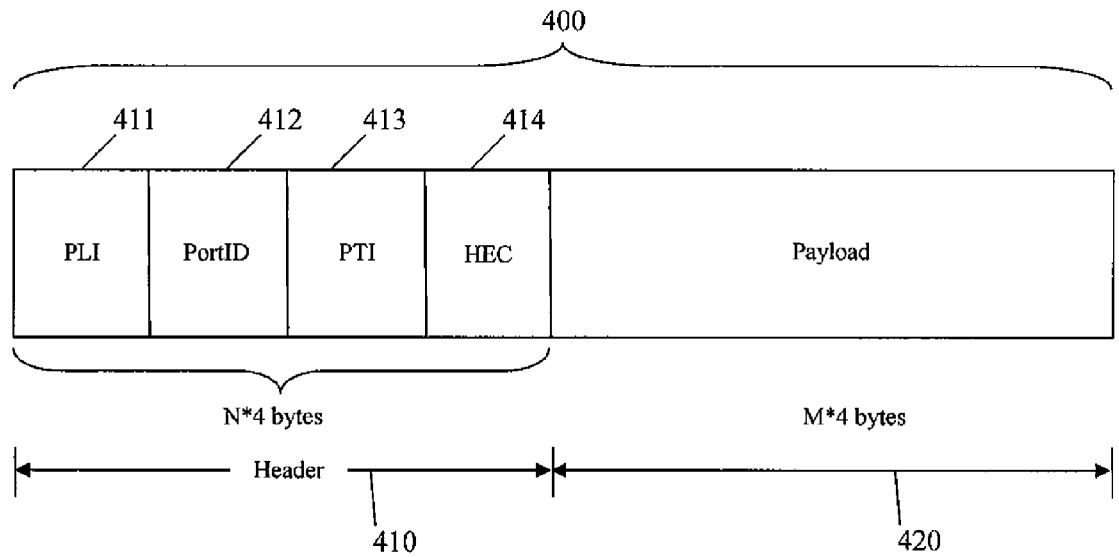
FIG. 4 is an illustration of an embodiment of a GPON Encapsulation Method payload.

FIG. 4 illustrates an embodiment of a GEM payload 400. The GEM payload 400 may comprise downstream data from the OLT 110 to the ONUs 120 or upstream data from an ONU 120 to the OLT 110. For instance, the GEM payload 400 may correspond to the Downstream Payload 220 of the downstream GTC frame 200 or the Upstream Payload 320 of the upstream GTC frame 300. The GEM payload 400 may comprise a Header 410 and a Payload 420. The Header 410 may comprise a Payload Length Indicator (PLI) 411, a Port identifier (PortID) 412, a Payload Type Indicator (PTI) 413, and a Header Error Control (HEC) 414.

The PLI 411 may indicate the length of the Payload 420 in bytes. The PLI 411 may also indicate the beginning of the GEM payload 400. The length of the PLI 411 may be equal to about 12 bits, which may indicate a Payload 420 having a length up to about 4,095 bytes. The PortID 412 may also have a length equal to about 12 bits, which may provide up to about 4,096 unique traffic identifiers. The traffic identifiers may correspond to a plurality of data flows, which may be multiplexed. The PTI 413 may indicate the content type of the Payload 420. The length of the PTI 413 may be equal to about three bits. The HEC 414 may provide error detection and correction functions. For instance, the HEC 414 may comprise about 12 bits of Bose and Ray-Chaudhuri (BCH) code, such as a BCH(39, 12, 2) code with a generator polynomial of $x^{12}+x^{10}+x^8+x^5+x^4+x^3+1$, and a single parity bit.

In the extended GTC layer, the total length of the Header 410 may be aligned with the increased word boundary. Specifically, the Header 410 may be an integer multiple of about four bytes long, for example about eight bytes long. Accordingly, the length of the PLI 411, the PortID 412, the PTI 413, the HEC 414, or combinations thereof may be increased. The length of the PLI 411 may be increased to indicate an extended GEM payload 400 comprising more bytes and information. The length of the PortID 412 may be increased to provide more traffic identifiers corresponding to more multiplexed data flows. The length of the PTI 413 may be increased to indicate more information about the Payload 420. The length of the HEC 414 may be increased to extend the BCH code to account for at least some of the additional bits of the extended Header 410, for instance for about 63 bits of the Header 410 leaving a remaining parity bit unprotected.

The Payload 420 may comprise the payload data transported between the OLT 110 and the ONUs 120. The Payload 420 may also be extended and aligned with the increased word boundary. For instance, up to about three padded bytes, e.g. null or zero value bytes, may be added to the Payload 420 to meet the word boundary alignment. If the Payload 420 is already aligned with the increased word boundary, then no padded bytes may be needed. The length of the Payload 420 and the padded bytes may be indicated using the PLI 411, the PTI 413, or both.

Figure 5:
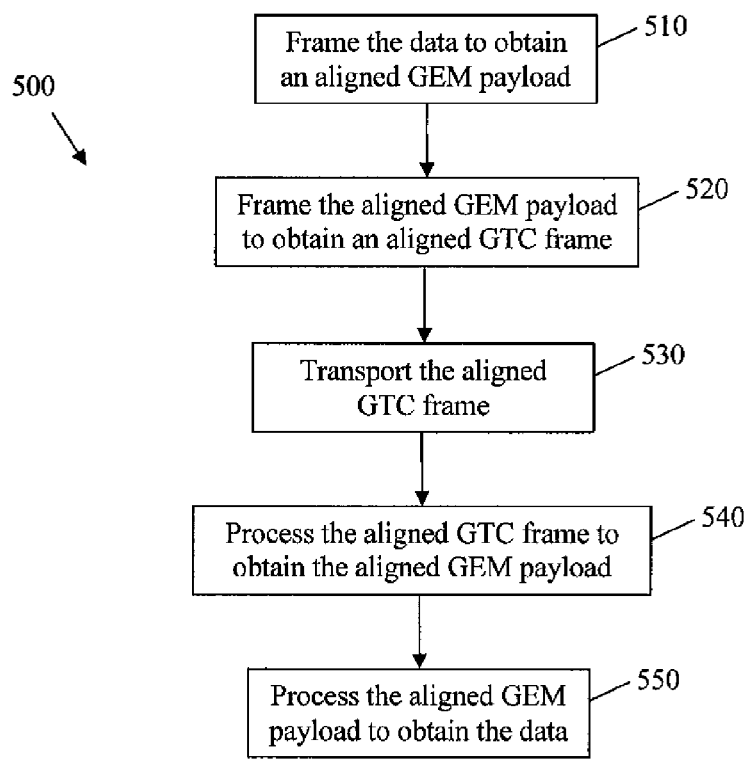
FIG. 5 is a flowchart of an embodiment of a framing method.

FIG. 5 illustrates one embodiment of a framing method 500, which may be used to encapsulate, transport, and decapsulate data, such as Ethernet data, in a PON system, such as the PON 100. The data may be transported from the OLT 110 to the ONUs 120 or from one of the ONUs 120 to the OLT 110. The data may correspond to a plurality of ONUs 120, a plurality of data flows, a plurality of T-CONTs, or combinations thereof. The framing method 500 may be implemented at the extended GTC layer of the GPON protocol.

At block 510, the framing method 500 may frame the data to obtain an aligned GEM payload, for instance using the data framer coupled to the transmitter at the OLT 110 or the ONU 120. As such, the data may be encapsulated with other information in the format of a GEM payload, such as the GEM payload 400. The other information may comprise the length of the data in bytes, the traffic identifiers of the data flows, the type of the data, other information related to the data, or combinations thereof. The GEM payload may then be aligned with the word boundary based on the downstream bandwidth of the system, which may be about ten Gbps. For instance, the data may be framed in an aligned payload portion of the GEM payload, such as the Payload 420, and the remaining information may be framed in an aligned header portion of the GEM payload, such as the Header 410.

At block 520, the framing method 500 may frame the aligned GEM payload to obtain an aligned GTC frame. Accordingly, the aligned GEM payload may be encapsulated with other information in the format of a GTC frame, such as the downstream GTC frame 200 or the upstream GTC frame 300. The other information may comprise a PLOAM message, the ONU-ID, bandwidth allocation for a T-CONT, other information related to the T-CONT, or combinations thereof. The GTC frame may then be aligned with the word boundary, which may be equal to about four bytes. For instance, the aligned GEM payload may be framed in a payload portion of the GTC frame, such as the Downstream Payload 220 or the Upstream Payload 320, and the remaining information may be framed in an aligned header portion of the GTC frame, such as the PCBd 210 or the PLOu 310.

At block 530, the framing method 500 may transport the aligned GTC frame between the OLT 110 and the ONU(s) 120 via at least some of the components of the PON system. For instance, the aligned GTC frame may be transported along the ODN 130 in a transparent manner without the knowledge of its data content. At block 540, the framing method 500 may process the aligned GTC frame to obtain the aligned GEM payload in a reverse manner of block 520, for instance using the data framer coupled to the receiver at the OLT 110 or the ONU 120. At block 550, the framing method 500 may process the aligned GEM payload to obtain the data in a reverse manner of block 510.

Figure 6:
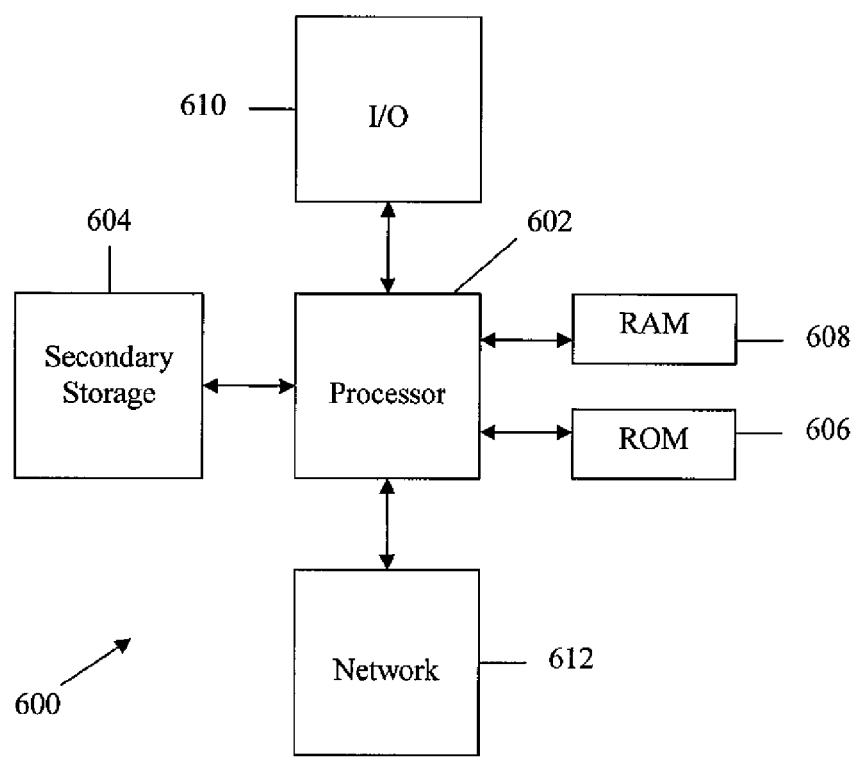
FIG. 6 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 6 illustrates a typical, general-purpose network component 600 suitable for implementing one or more embodiments of the components disclosed herein. The network component 600 includes a processor 602 (which may be referred to as a central processor unit or CPU) that is in communication with memory devices including secondary storage 604, read only memory (ROM) 606, random access memory (RAM) 608, input/output (I/O) devices 610, and network connectivity devices 612. The processor 602 may be implemented as one or more CPU chips, or may be part of one or more application specific integrated circuits (ASICs).

The secondary storage 604 is typically comprised of one or more disk drives or tape drives and is used for non-volatile storage of data and as an over-flow data storage device if RAM 608 is not large enough to hold all working data. Secondary storage 604 may be used to store programs that are loaded into RAM 608 when such programs are selected for execution. The ROM 606 is used to store instructions and perhaps data that are read during program execution. ROM 606 is a non-volatile memory device that typically has a small memory capacity relative to the larger memory capacity of secondary storage 604. The RAM 608 is used to store volatile data and perhaps to store instructions. Access to both ROM 606 and RAM 608 is typically faster than to secondary storage 604.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
   at least one optical network component configured to implement a method comprising:
   encapsulating a data stream with at least one Gigabit Passive Optical Network (GPON) Encapsulation Method (GEM) payload aligned with a word boundary at least about four bytes long;
   encapsulating the GEM payload with a GPON Transmission Convergence (GTC) frame aligned with the word boundary; and
   transmitting the GTC frame.

2. The apparatus of claim 1, wherein the method further comprises:
   receiving a second GTC frame aligned with the word boundary;
   processing the second GTC frame to obtain a second GEM payload aligned with the word boundary; and processing the second GEM payload to obtain a second data stream.

3. The apparatus of claim 1, wherein the GTC frame comprises a Physical Control Block downstream (PCBd).

4. The apparatus of claim 3, wherein the PCBd comprises a Physical Synchronization (PSync), an Identification (Ident), a Physical Layer Operations, Administration and Maintenance downstream (PLOAMd), a Bit Interleaved Parity (BIP), a Payload Length Downstream (Plend), and an upstream Bandwidth map (US BWmap).

5. The apparatus of claim 4, wherein the PLOAMd is an integer multiple of about four bytes long, the BIP is about four bytes long, and the US BWmap is about four bytes long.

6. The apparatus of claim 5, wherein a granularity of the US BWmap is about four bytes.

7. The apparatus of claim 4, wherein the PLOAMd comprises an optical network unit (ONU) identifier (ONU-ID) about two bytes long.

8. The apparatus of claim 4, wherein the Plend comprises a B length (Blen) and a Cyclic Redundancy Check (CRC) and does not comprise an A length (Alen).

9. The apparatus of claim 1, wherein the GTC frame comprises a Physical Layer Overhead upstream (PLOu), a Physical Layer Operations, Administration and Maintenance upstream (PLOAMu), and a Dynamic Bandwidth Report upstream (DBRu).

10. The apparatus of claim 9, wherein the PLOu comprises a Preamble, a Delimiter, a Bit Interleaved Parity (BIP), an optical network unit (ONU) identifier (ONU-ID), and an Indication (Ind).

11. The apparatus of claim 10, wherein the ONU-ID is about two bytes long, the PLOAMu is an integer multiple of about four bytes long, and the DBRu is about four bytes long.

12. The apparatus of claim 1, wherein the GEM payload comprises a Header and a Payload, and wherein the Header is an integer multiple of about four bytes long and the Payload is an integer multiple of about four bytes long.

13. The apparatus of claim 12, wherein the Header comprises a Payload Length Indicator (PLI), a Port identifier (PortID), a Payload Type Indicator (PTI), and a Header Error Control (HEC).

14. The apparatus of claim 13, wherein at least one of the PLI, the PortID, the PTI, the HEC is sized to align the GEM Header to the word boundary.

15. A method comprising:
encapsulating a data stream into a plurality of fields;
aligning the lengths of the fields individually or combined to a word boundary equal to at least about four bytes;
packaging the fields into a frame; and
transmitting the frame,
wherein the word boundary is an integer multiple of about four bytes long, and wherein the data stream is transmitted downstream at about ten Gigabits per second (Gbps) or upstream at about at least 2.5 Gbps.

16. A method for framing data, comprising:
encapsulating a data stream into at least one Gigabit Passive Optical Network (GPON) Encapsulation Method (GEM), frame;
encapsulating the GEM frame into a GPON Transmission Convergence (GTC) frame; and
transmitting the GTC frame,
wherein the GTC frame is aligned to 4-byte word boundaries, and
wherein the GTC frame is transmitted downstream at about ten Gigabits per second (Gbps) or upstream at about at least 2.5 Gbps.

* * * * *

UNITED STATES PATENT AND TRADEMARK OFFICE
CERTIFICATE OF CORRECTION

| | | |
|---|---|---|
| PATENT NO. | : 8,351,785 B2 | |
| APPLICATION NO. | : 12/355837 | |
| DATED | : January 8, 2013 | |
| INVENTOR(S) | : Yuanqiu Luo et al. | |

It is certified that error appears in the above-identified patent and that said Letters Patent is hereby corrected as shown below:

Column 12 Line 24 should read: "A method for framing data, comprising: encapsulating a data stream into at least one Gigabit Passive Optical Network (GPON) Encapsulation Method (GEM) frame; encapsulating the GEM frame into a GPON Transmission Convergence (GTC) frame; and transmitting the GTC frame, wherein the GTC frame is aligned to 4-byte word boundaries, and wherein the GTC frame is transmitted downstream at about ten Gigabits per second (Gbps) or upstream at about at least 2.5 Gbps.

Signed and Sealed this
Second Day of April, 2013

Teresa Stanek Rea
*Acting Director of the United States Patent and Trademark Office*